United States Patent [19]
Pippinger

[11] Patent Number: 4,457,660
[45] Date of Patent: Jul. 3, 1984

[54] APPARATUS FOR STORING AND DISPENSING SEVERAL BULK MATERIALS

[75] Inventor: Horst Pippinger, Karlsruhe, Fed. Rep. of Germany

[73] Assignee: Elba-Werk Maschinen-Gesellschaft mbH & Co., Ettlingen, Fed. Rep. of Germany

[21] Appl. No.: 406,886

[22] Filed: Aug. 10, 1982

[30] Foreign Application Priority Data

Sep. 5, 1981 [DE] Fed. Rep. of Germany ....... 3135197

[51] Int. Cl.$^3$ .......... B65G 3/20
[52] U.S. Cl. .......... 414/332; 414/328
[58] Field of Search .......... 414/266-269, 414/328, 332, 919; 52/64, 71, 591, 780

[56] References Cited

U.S. PATENT DOCUMENTS

| | | | |
|---|---|---|---|
| 1,059,064 | 4/1913 | Mullen | 414/329 |
| 1,715,853 | 6/1929 | Madsen | 52/64 |
| 2,678,737 | 5/1954 | Mangrum | 414/332 X |
| 3,251,169 | 5/1966 | Cornelissen | 52/780 |

*Primary Examiner*—Joseph E. Valenza
*Assistant Examiner*—David A. Bucci
*Attorney, Agent, or Firm*—Karl F. Ross; Herbert Dubno

[57] ABSTRACT

An apparatus for the metered dispensing of several bulk materials has an elongated and horizontal base having a pair of longitudinal sides and provided with a longitudinally extending floor and having pairs of posts spaced along the floor and subdividing same longitudinally into a row of zones. Reapective legs at the posts hold the frame above the ground. Respective longitudinal and transverse side and end walls releasably secured to the posts transversely and longitudinally bound the zones. Thus each zone is formed into an upwardly open hopper having a respective floor valve openable to release bulk material from the respective hopper through the floor. A track fixed to the frame extends longitudinally underneath the zones. A bucket car is displaceable along the track underneath the valves. The side walls are laterally concave toward the respective zones and extend laterally beyond the respective sides. Respective horizontal floor sections extend laterally from the frame toward the sides and forming horizontal lateral extensions of the floor.

12 Claims, 5 Drawing Figures

APPARATUS FOR STORING AND DISPENSING SEVERAL BULK MATERIALS

FIELD OF THE INVENTION

The present invention relates to an apparatus for storing and dispensing several bulk materials. More particularly this invention concerns such an apparatus which can be transported to a building project for on-site blending of concrete.

BACKGROUND OF THE INVENTION

It is known, for example on a big project, to mix macadam, concrete, or the like on the spot. For concrete the various components—coarse and fine aggregate and cement—are carefully measured out, then blended with each other dry, then with water to form concrete. The advantage of mixing ones own concrete, for example, is that the concrete is fresher than ready mix and can be mixed differently for different applications. In addition in large quantities it is much cheaper to mix ones own concrete, as compared to buying ready-mix, which may not even be available.

This is accomplished by an apparatus which normally has three or four rigid prismatic hoppers or silos all carried on a frame and each provided at its base with a metering gate. This entire unit is delivered to the site, normally on a flat-bed semitrailer. Once installed, a mound of earth is built next to it so a front loader or the like can dump the various bulk materials into the respective hoppers. A weighing carriage or bucket car can move along the frame underneath the gates to receive from the hoppers, one at a time, predetermined volumes or masses of the respective bulk materials. Once filled with the appropriately proportioned mixture this carriage is dumped out into a blender or mixer.

Such an apparatus is quite difficult to set up and get into operation. Building the mound next to it so a filling device can ascend high enough to unload into the hoppers is a burdensome task, as the mound must be quite wide in order not to collapse under the weight of the loader. In addition the various hoppers are normally rather small, since they must be able to pass along the highways, that is they must be narrower than maximum truck width (about 8 ft) and similarly short. The standard apparatus also normally has a maximum of three bins or hoppers, so that if more are needed it is necessary to employ a wholly different piece of equipment.

OBJECTS OF THE INVENTION

It is therefore an object of the present invention to provide an improved apparatus for temporarily storing and for mixing several bulk materials.

Another object is the provision of such an apparatus for the storage and metered dispensing of several different bulk materials which overcomes the above-given disadvantages.

A further object is an apparatus of this type which can be set up relatively easily and which can hold relatively important quantities of the various bulk materials it is being used to dispense so that it need not be refilled often.

SUMMARY OF THE INVENTION

These objects are attained according to the instant invention in a apparatus for the metered dispensing of several bulk materials having an elongated and horizontal base having a pair of longitudinal sides and provided with a longitudinally extending floor and having pairs of posts spaced along the floor and subdividing same longitudinally into a row of zones. Respective legs at the posts hold the frame above the ground. Respective longitudinal and transverse side and end walls releasably secured to the posts transversely and longitudinally bound the zones. Thus each zone is formed into an upwardly open hopper having a respective floor valve openable to release bulk material from the respective hopper through the floor. A track fixed to the frame extends longitudinally underneath the zones. A bucket car is displaceable along the track underneath the valves.

Thus with the apparatus of the instant invention the hoppers do not have to be very small, since they are erected on the job. It is therefore possible for the hoppers to be of a vertical section that is substantially greater than anything that could be trucked.

In order to make the hoppers relatively capacious, the side walls according to this invention are laterally concave toward the respective zones and extend laterally beyond the respective sides. In addition the apparatus has respective horizontal floor sections extending laterally from the frame toward the sides and forming horizontal lateral extensions of the floor. The side walls can be generally part-cylindrical and the end walls generally planar. In this case the floor sections can be hinged on the respective sides of the frame. With such a system, therefore, once the apparatus is brought to the site the legs are lowered or installed to support the device above the ground, the side and end walls are installed, the pedestal is raised, and the floor sections are swung up. The legs according to this inventin are telescoped in the posts so that they can be lowered easily and will be optimally positioned to support the apparatus.

This procedure leaves the device ready to load from a crane of the like, with a procedure that even relatively unskilled laborers can carry out. In addition the laterally projecting hoppers therefore are mainly cylindrical—a very efficient shape for storage—and are of greater diameter than the maximum standard highway width, which is normally about 8 feet, so that the hoppers can hold a volume which is substantially greater than that which could be contained by any prior-art system.

According to another feature of this invention the frame extends longitudinally forward of the row of hoppers. This free front end has drive means connected to the car for displacing same along the track underneath the valves. This drive means includes a pedestal displaceable between a travel position lying down on the frame and a use position standing up on the frame ahead of the zones. A simple endless-cable arrangement connected to the car and passing over various guide pulleys allows the car not only to move along underneath the frame, but can pivot it over to dump it out at the forward end once it is full.

In order to facilitate the construction of the ramp mound, anchor walls attachable to the posts and extending laterally from the frame generally below the level of the side walls. Thus the side walls can retain a ramp mound next to the frame. A relatively small mound can be built, and this mound will serve to stabilize and anchor the apparatus just as the apparatus stabilizes the mound.

It is also possible for the apparatus to have at least one longitudinally extending upright longitudinal partition in one of the zones extending between the respective end walls above the respective gate and transversely subdividing the one zone. In this case the gate of the one zone is a transversely split double gate. This split hopper can therefore contain two separate materials.

DESCRIPTION OF THE DRAWINGS

The above and other features and advantages will become more readily apparent from the following, reference being made to the accompanying drawings in which.

SPECIFIC DESCRIPTION

Figure 1:
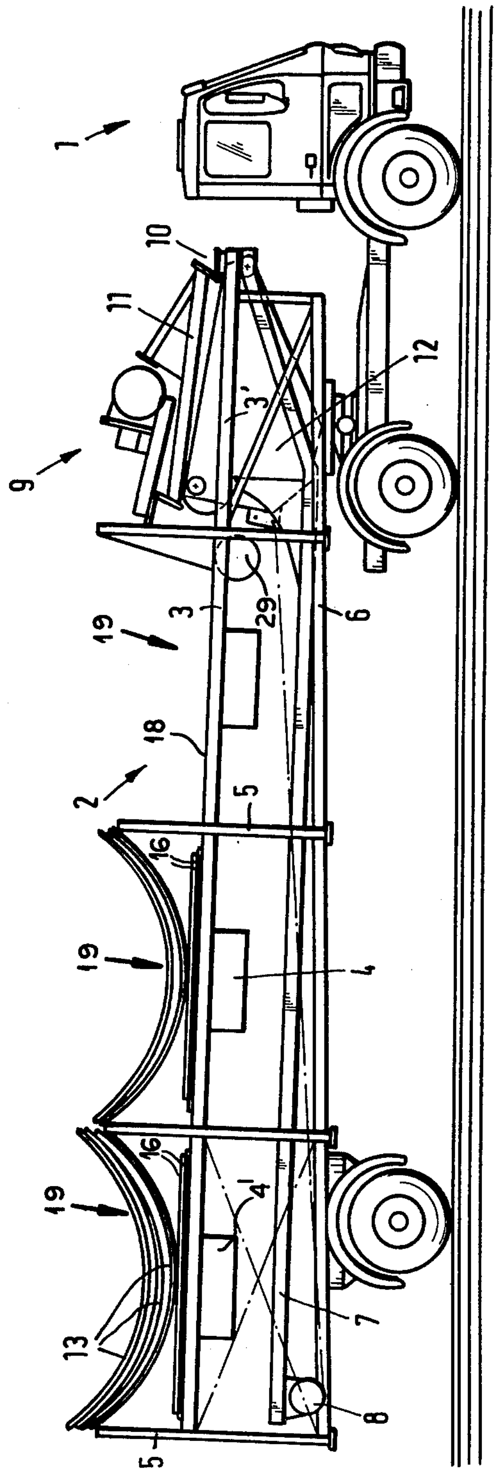
FIG. 1 is a side view of the apparatus of this invention as it is trucked.

As seen in FIG. 1, the apparatus 2 of this invention can be transported on a six- to ten-wheel flatbed semi-trailer 1 of conventional size. This apparatus basically comprises a frame 3 having a front end portion 3′ carrying a drive arrangement 9 itself comprising a pedestal 11 connected via a hinge 10 to the extreme front end of the frame 3. The frame 3 has a longitudinally extending lower members 6 by means of which it rests on the bed of the truck 1.

This frame 3 has a floor 18 and is provided with four pairs of posts 5 that subdivide it longitudinally into three identical zones 19. The floor 18 and lower members 6 of the frame 3 are not parallel, but converge toward the front. Standard metering gates 4 are provided in each zone 19, and at least the rearmost gate 4′ is double, that is transversely split into two separate gates. Such devices can be cell wheels or the like that deliver a predetermined volume or mass of material with each revolution. This type of feeder is standard on feed hoppers.

Figure 3:
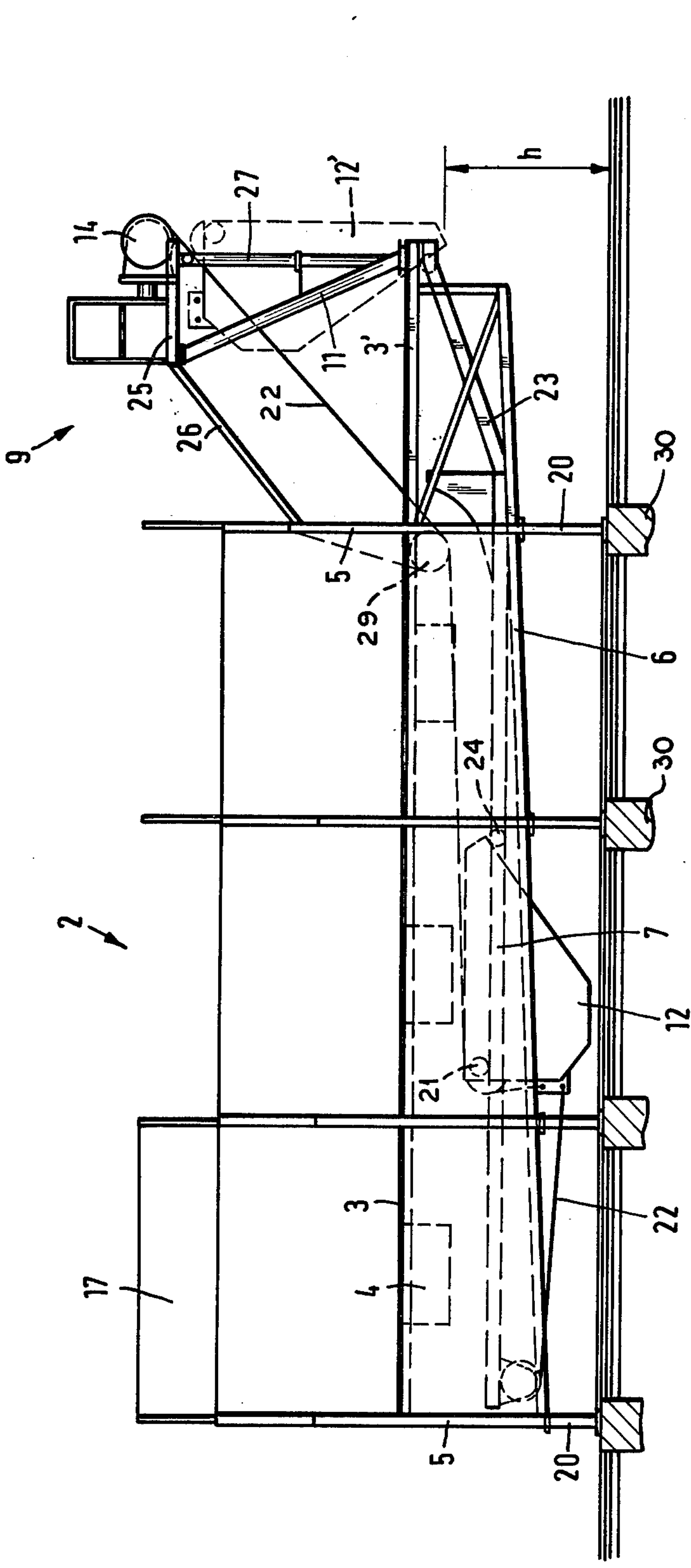
FIG. 3 is a side view of the system of the instant invention set up for use.

A pair of transversely spaced U-section guide rails or tracks 7 extend underneath the floor 18 parallel to each other and support a bucket car 12 by means of rear rollers 21 riding on top of the tracks 7 and front rollers 24 captured and riding in the confronting channel tracks 7. A chain or cable 22 has both ends attached to the rear end of the bucket car 12 and passes around a rear guide pulley 8 and under a front deflector pulley 29. In addition this cable 22 passes over a pulley of a drive motor 14 carried at the upper end of a vertical post 27 forming the pedestal with another post 26, a horizontal frame 25, and a support strut 11 (FIG. 3).

In transit as shown in FIG. 1 the pedestal 11 is hinged down. In addition part-cylindrical side walls 13, flat end walls 16, and a single front end wall 16′ that is curved between its ends are stacked on the floor 18. Thus the entire system has an overall width b′ which can easily be narrow enough to move on standard highways. In transit the bucket car 12 is folded under the drive 9 at the front end 3.

Figures 2, 2A:
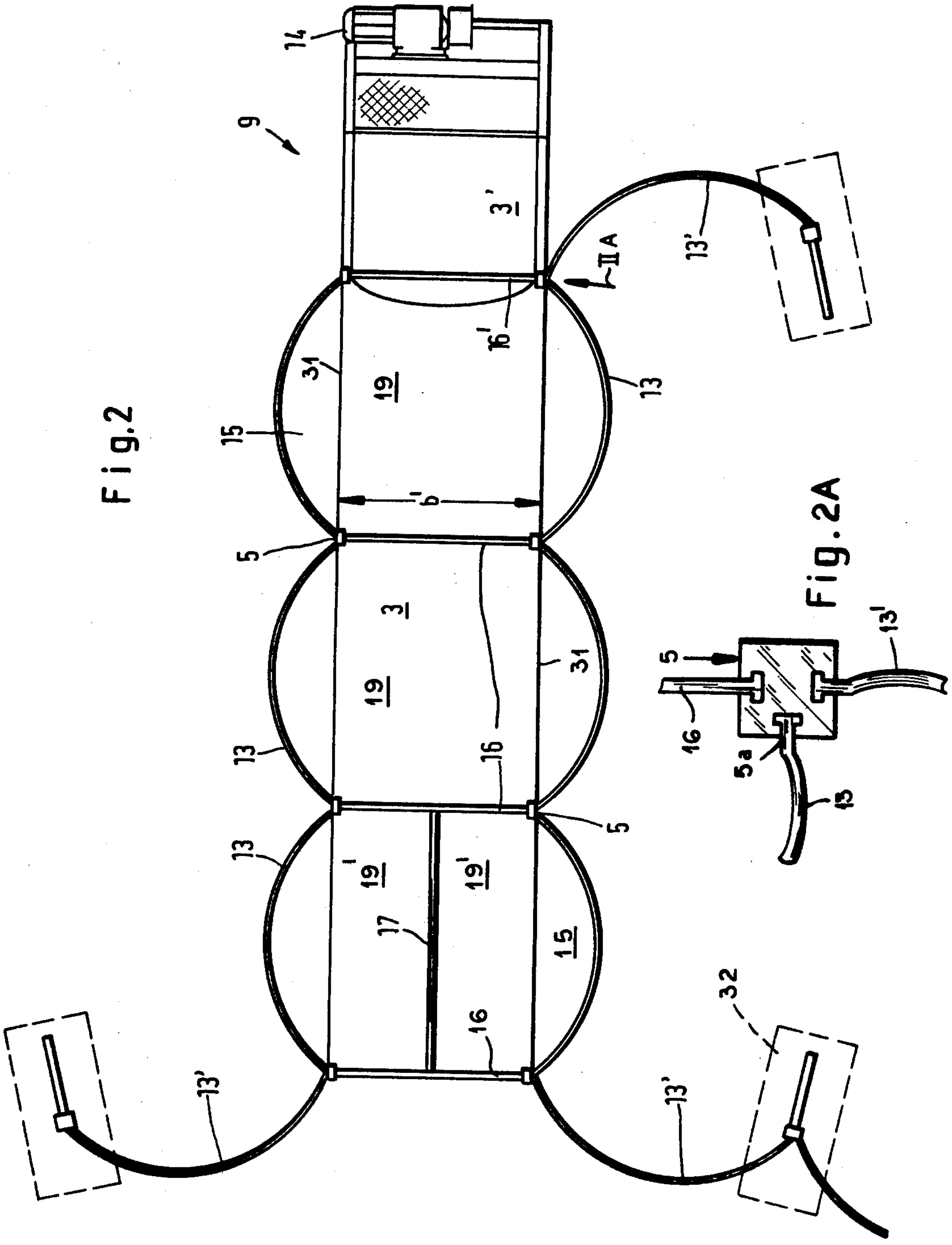
FIG. 2 is a top view of the system of this invention in use position.
FIG. 2A is a large-scale view of the detail of FIG. 2 indicated by arrow 2A.

At the site the frame 3 is loaded off the truck 1 and telescopic extensions 20 of the posts 5 are lowered to support the arrangement on the ground, normally on appropriately positioned blocks 30. The legs 20 hold the frame a distance f above the ground sufficient to give clearance to the bucket 12 as will become apparant below. Then the arcuate walls 13 are fitted to the posts 5, to which end they have beaded edges which can slide down in vertical grooves 5*a* of complementary section of the posts 5, like sheet piling as indicated in FIG. 2A. The flat transverse walls 16 are similarly fitted between the pairs of posts 5 to transform the zones 19 into three hoppers. The space between the bottom edge of each wall 13 and the respective outer edge of the floor 18 is filled by respective floor sections 15 secure by hinges 31 thereto. These sections 15 are pivoted up and locked to the lower edges of the sides 13, normally inclined down toward the gate 4 for natural emptying of the hoppers 19.

In addition the pedestal 11 is hinged up and locked in place. In this position the motor 14 can therefore move the bucket car 12 not only along underneath the floor 18, but also underneath the front end 3′ of the frame 3. As it moves along underneath the floor 18 it projects downwardly below the lowermost longitudinal members 6 of the frame. The front ends 23 of the rails 7 are inclined upwardly toward the front so that as the car 12 is pulled to the front first it will be raised as its rollers 24 ride up the sections 23. Then as the motor 14 continues to pull in the cable 22 it will lift the rear wheels 21 off the rails 7 and move the car 12 into the position indicated in dot-dash lines at 12′. In this position 12′ the car can dump or empty itself at a height h above the ground which is sufficient to clear a standard construction bucket or truck that is receiving the load.

The walls 16 are substantially higher than the walls 13 to prevent the contents of the various bins from mixing. In addition it is possible to fit a longitudinal partition wall 17 across at least the rear hopper or bin to form it into two subbins 19′ each emptiable through a respective side of the respective double gate 4′. This longitudinal partition 17 is also much taller than the walls 13.

Figure 4:
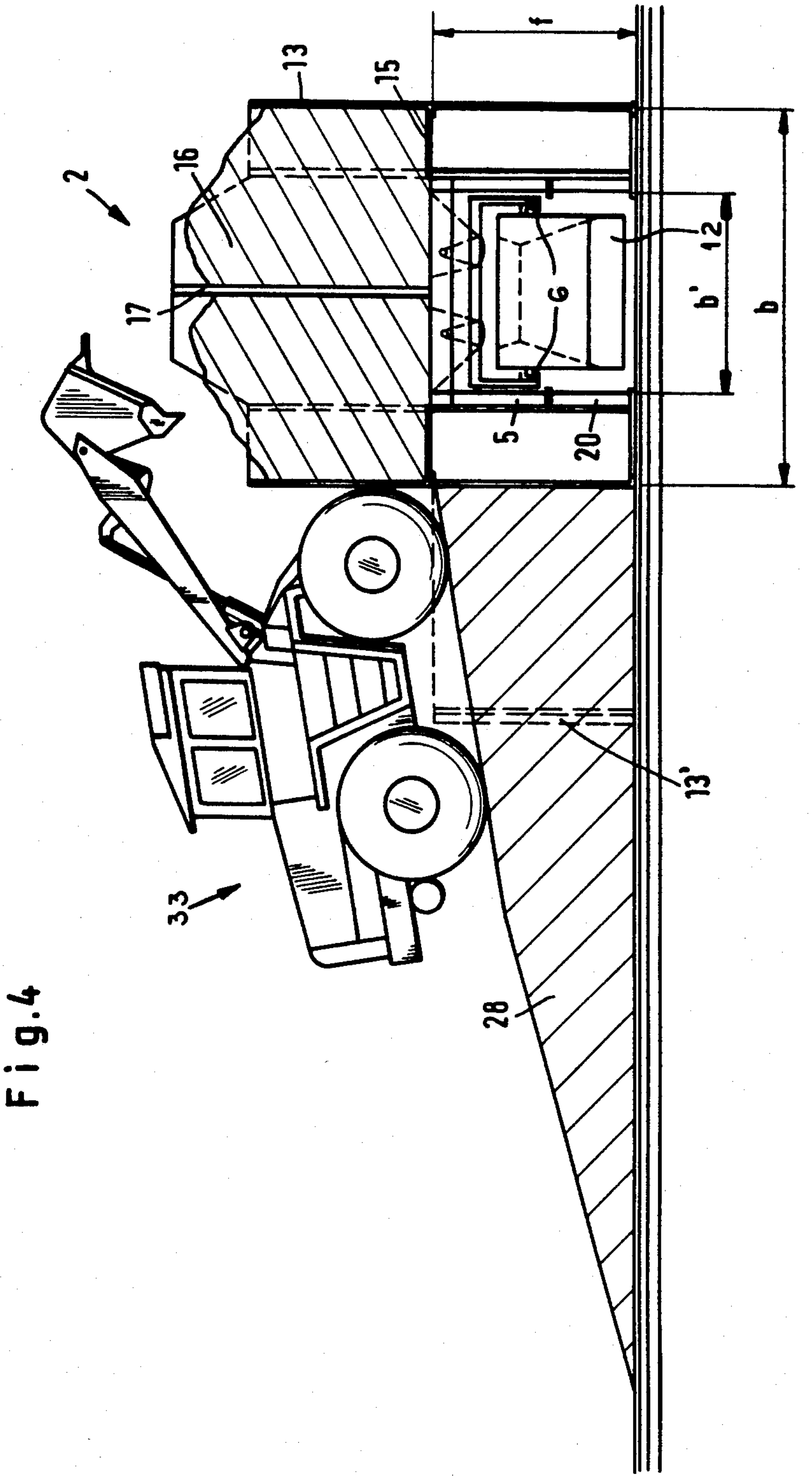
FIG. 4 is a front end view showing the system of the invention being filled.

Further curved walls 13′ can be connected to outwardly directed slots 5*a* in the posts. The other ends of these walls 13′ can be seated in temporary posts carried on stands 32 outside the frame 1. A front loader 33 can then as shown in FIG. 4 build a ramp mound 28 that is forwardly and backwardly stabilized by these walls 13′. Any sort of panel can be laid against the legs 20 on that side of the frame to keep the dirt of the mount 28 from filling underneath the frame 3. Then the front loader 33 can dump the appropriate materials as piles into the various hoppers 19.

The gates 4 are normally of the type that drop a fixed quantity, normally 0.5 $ft^3$ *L or* 1.0 $ft^3$, of the respective bulk material. Thus the motor 14 is actuated to position the car 12 under each gate 4, which is then actuated to deposit the required quantity of the respective material into the car. Once the appropriate mixture is formed the car 12 is dumped out at the front.

The use of hoppers 19 having two third- to half-cylindrical sides and two flat sides allows these hoppers 19 to be relatively capacious. They can have an overall width b which is substantially greater than the travel width b′. In fact they can hold about one-half more than conventional hoppers, whose maximum transverse dimension would have to be b′.

In addition when traveling all of the high points of the apparatus of this invention can be lowered, principally by tipping over the drive 9 and taking out the walls 13 and 16. Pulling the bucket 12 up to the front allows the apparatus further to rest on its lower beams 6. The system therefore can be reduced vertically and horizontally for transport, while opening up to a big, heavy-duty piece of equipment.

I claim:

1. An apparatus for the metered dispensing of several bulk materials, said apparatus comprising:
- an elongated and horizontal frame having a pair of longitudinal sides and provided with a longitudinally extending floor;
- pairs of posts spaced along said floor and subdividing same longitudinally into a row of zones;
- respective legs at said posts holding said frame above the ground;
- respective transverse end walls releasably secured to said posts and longitudinally bounding said zones;
- respective horizontal floor sections extending laterally from said frame toward said side walls and forming horizontal lateral extensions of said floor;
- respective longitudinal side walls releasably secured to said posts and transversely bounding said zones, whereby each zone is formed into an upwardly open hopper;
- respective floor valves in said floor at said zones and openable to release bulk material from the respective hoppers through said floor;
- a track fixed to said frame and extending longitudinally underneath said zones; and
- a bucket car displaceable along said track underneath said valves.

2. The bulk-dispensing apparatus as defined in claim 1 wherein said frame extends longitudinally forward of said row of zones, said apparatus further comprising:
- drive means on said frame ahead of said zones and connected to said car for displacing same along said track underneath said valves.

3. The bulk-dispensing apparatus defined in claim 2 wherein said drive means includes a pedestal displaceable between a travel position lying down on said frame and a use position standing up on said frame ahead of said zones.

4. The bulk-dispensing apparatus defined in claim 1 wherein said side walls are laterally concave toward the respective zones and extend laterally beyond the respective sides.

5. The bulk-dispensing apparatus defined in claim 4 wherein said side walls are generally part-cylindrical and said end walls are generally planar.

6. The bulk-dispensing apparatus defined in claim 4 wherein said floor sections are hinged on the respective sides of said frame.

7. The bulk-dispensing apparatus defined in claim 1, further comprising:
- anchor walls attachable to said posts and extending laterally from said frame generally below the level of said side walls, whereby said side walls can retain a ramp mound next to said frame.

8. The bulk-dispensing apparatus defined in claim 1, further comprising:
- at least one longitudinally extending upright longitudinal partition in one of said zones extending between the respective end walls above the respective gate and transversely subdividing said one zone, the gate of said one zone being a transversely split double gate.

9. The bulk-dispensing apparatus defined in claim 1 wherein said side walls are laterally concave toward the respective zones and extend laterally beyond the respective sides, said frame being standard highway width between said sides, said apparatus being substantially wider with said side walls on said posts.

10. The bulk-dispensing apparatus defined in claim 1 wherein said legs are telescoped in said posts.

11. The bulk-dispensing apparatus defined in claim 1 wherein said frame extends longitudinally forward of said row of zones, said car projecting downward past said frame when underneath said floor, said car being movable along said track into a position ahead of said hoppers in which it does not project downwardly past said frame.

12. The bulk-dispensing apparatus defined in claim 1 wherein said drive means includes a winch at the front end of said frame ahead of said hoppers, an endless flexible element connected to said car, and a pulley at the opposite rear end of said frame underneath said hoppers.

* * * * *